J. G. Wilber.
Hop Pole.
N° 80,104. Patented Jul. 21, 1868.

WITNESSES:
P. T. Dodge
Jno. Johnson

INVENTOR:
J. G. Wilber
Dodge & Munn
his Attorneys

United States Patent Office.

JAMES G. WILBER, OF KILBURN CITY, WISCONSIN.

Letters Patent No. 80,104, dated July 21, 1868.

IMPROVEMENT IN HOP-POLES.

*The Schedule referred to in these Letters Patent and making part of the same.*

---

TO ALL WHOM IT MAY CONCERN:

Be it known that I, JAMES G. WILBER, of Kilburn City, in the county of Columbia, and State of Wisconsin, have invented certain new and useful Improvements in "Hop-Poles;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to "hop-poles," and consists in the arrangement of two or more poles on and about a post, in a novel manner, so that they may be easily put up and taken down.

In the drawings—

I construct my hop-pole of a post, A, of any desired size and form, preferring, however, to make it square, and long enough to stand about two feet in the ground and about six feet above the ground.

Figure 1:
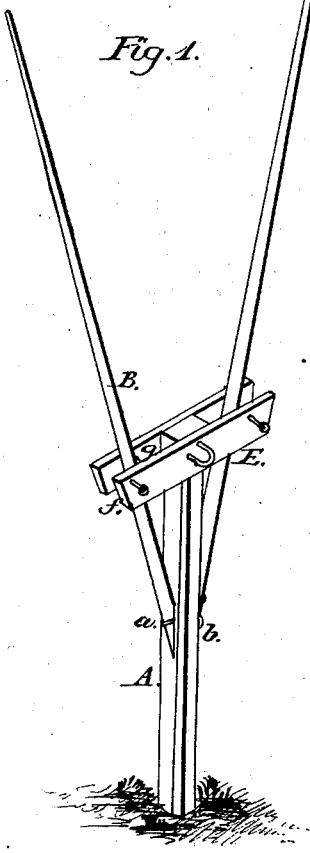
Figure 1 is a plan view.

On the opposite sides of the top of the post A, I nail two strips of board, E, about four inches in width, and about two feet in length, horizontally, and parallel with each other. Between the boards E, I place two diverging poles, B, with their lower ends resting in wire staples, a, driven into the post A, and hold them in place by pins f and g, inserted in the boards E, as shown clearly in figs. 1, 2, and 3.

The pin g, I put in permanently, but the pin f is inserted so that it may be removed easily, when desired. These pins f and g may be of wood or metal.

The poles B may be of any desired length, but as the posts A are set at the same distance apart that the hop-hills are placed, I prefer them of such a length that, when in position, their upper ends will about equally divide the distance or space between the hop-hills.

Figure 4:
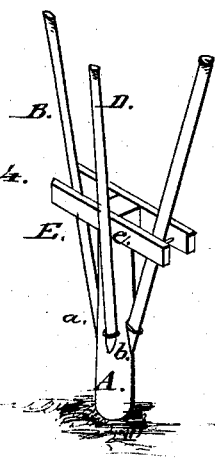
Figure 4 is a plan view.

When desired, a third pole, F, may be inserted in the staple c, and with its lower end resting in the staple b, as clearly shown in fig. 4.

Figure 2:
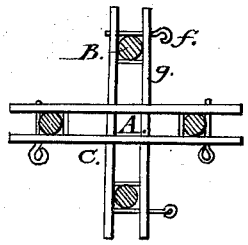
Figure 2 is a transverse section of a pole with four uprights.
Figure 3:
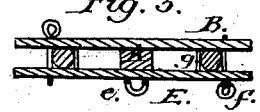
Figure 3 is a transverse section of fig. 1.

By putting on two other boards, C, at right angles to the boards E, and just under them, as shown in fig. 2, four poles may be used.

This arrangement of poles has many advantages. The post A can remain in the ground from one season till the next. The diverging poles may be light, and are easily put up, it only being necessary to pull out the pin f, then place the pole in position, and insert the pin again. Their diverging tops let in the sun and air, so that all parts of the vines are fully exposed, and, when hop-picking time comes, each diverging pole can be conveniently taken down, for the purpose of gathering the hops, and are afterwards put away and preserved for use the next season.

In many sections of the country the cultivation of hops has become so general that there is much difficulty in procuring single poles, and their cost has consequently increased of late years largely, and when these large single poles are used, there is difficulty in getting them down, with a great mass of vines about them, for the purpose of gathering the hops; but in the use of my arrangement pole, smaller and lighter poles can be used, which are more easily obtained and much more easily handled. It enables the cultivator of hops to raise a larger crop, and to gather it with less labor than when the single pole is used.

Having thus described my invention, what I claim, is—

1. A hop-pole, consisting of a stationary post, A, with removable diverging poles B, mounted in foot-staples a, and held in position by cross-boards E and pins f and g, substantially as herein described.

2. A hop-pole, consisting of a stationary post, A, with removable diverging poles B, and removable upright pole D, mounted in foot-staples a b, the former held in place by the cross-boards E, pins f and g, and staple e, substantially as herein described.

JAMES G. WILBER.

Witnesses:
J. L. GRIFFETH,
M. GRIFFIN.